Figure 1:
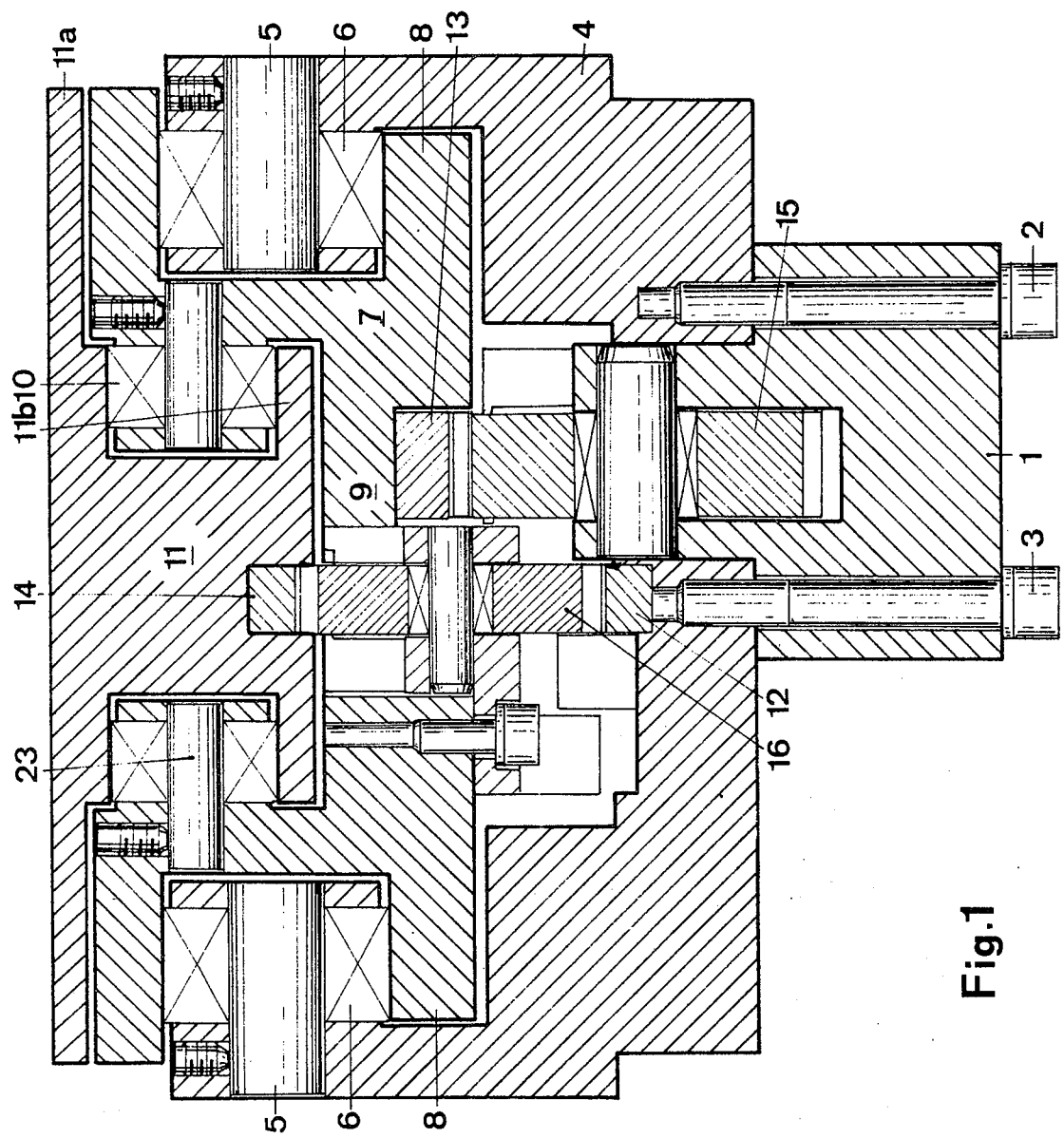

United States Patent [19]
Grebenstein

[11] 3,883,022
[45] May 13, 1975

[54] LOAD DISPLACEMENT APPARATUS

[75] Inventor: Hermann Grebenstein, Erlinsbach, Switzerland

[73] Assignee: Oehler-Syhlen-Lagertechnik A.G., Aarau, Switzerland

[22] Filed: May 1, 1974

[21] Appl. No.: 465,893

Related U.S. Application Data

[63] Continuation of Ser. No. 290,893, Sept. 21, 1972, abandoned.

[52] U.S. Cl. ............ 214/750; 214/16.4 A; 214/730
[51] Int. Cl. .............................................. B66f 9/14
[58] Field of Search ....... 214/16.4 A, 750, 730, 731

[56] References Cited
UNITED STATES PATENTS

| | | | |
|---|---|---|---|
| 3,175,722 | 3/1965 | Paulssen | 214/16.4 A |
| 3,549,025 | 12/1970 | Messner | 214/730 |
| 3,556,329 | 1/1971 | Johnston | 214/730 |
| 3,561,620 | 2/1971 | Willis | 214/730 |

*Primary Examiner*—Robert J. Spar
*Assistant Examiner*—Lawrence J. Oresky
*Attorney, Agent, or Firm*—Abraham A. Saffitz

[57] ABSTRACT

Load displacement apparatus for, e.g. transporting pallets in shelf storage, includes telescopic carrier arms. Each arm has a first, fixed rail of U-shaped section, a second rail telescopically movable over the first rail and having two side parts of oppositely facing U-section. The third rail is telescopically movable over the second rail and is of I-section, one of the two parallel surfaces of which is wider than the other to serve as a loading surface. Movement of the rails is guided by rollers and is effected by a rack-and-pinion arrangement.

1 Claim, 2 Drawing Figures

LOAD DISPLACEMENT APPARATUS

This is a continuation, of application Ser. No. 290,983, filed Sept. 21, 1972, now abandoned.

The present invention relates to a load displacement apparatus, particularly, but not exclusively, for changing the location of pallets in stores, warehouses and the like.

Such load displacement apparatuses often embody telescopic tables or forks so as to be capable of passing with minimum space requirements between the constructions, e.g. shelves, storing goods. Particularly for shelf stores, it is desirable to keep the load displacement apparatuses as small as possible so as optimally to exploit the space available within the store building for the storage shelves. Thus the width of the passageway used for changing the location of a given load should be as small as possible and should be just capable of accommodating the apparatuses serving to transfer the load.

Load displacement apparatuses of the kind mentioned above have already been proposed, which comprise at least two carrier arms each of which is constructed from three telescopically extensible rails. Customarily, one of the rails is fixed relative to the displacement apparatus, the second rail is displaceable by actuating means on the fixed rail and the third rail is displaceable by actuating means on the second rail. The components of these known load displacement apparatuses are made from high-grade steel, have fine-finished guide tracks and thus represent relatively expensive precision machine parts. This is stipulated by the requirement of nearly tolerance-free load movement which is important particularly in transporting goods with standardised flat pallets. That is to say, these comprise relatively restricted running-in permitted differences between actual and nominal sizes for the load-suporting fork, so that e.g. with a pallet height of 100 mm and a fork thickness of 70 mm a height tolerance of only 15 mm exists at the top and the bottom between a fork and a pallet that is still new. This tolerance is reduced still further for an older, used pallet or when the pallet is heavily loaded and consequently sags.

However, in order to have the greatest possible tolerance available for the usual movement cycle of a transfer device or a storage machine, the tolerances between the cross-section of the fork and the entry dimension of the pallet should stay as large as possible if reliable, automatic loading is to be ensured. But the greater the load supported on the pallet, the greater is the required cross-section of the load-supporting fork. For this reason known telescopic forks of the mentioned kind could only be built for loads of about 1,000–1,200 kg. A further disadvantage resides in that they must mostly be made, for manufacturing reasons, so that the smallest load is associated with the greatest fork cross-section and vice versa.

It is the aim of the present invention to propose a load displacement apparatus of the kind mentioned hereinabove, which seeks to offer some noteworthy advantages over known constructions. The proposed load displacement apparatus seeks to be easier to manufacture without, however, diminishing the high precision to be attained and by virtue of its inherent constructions, seeks to be capable of taking greater loads than known telescopic forks of the same total cross-section.

According to the invention, there is provided load displacement apparatus comprising at least two carrying arms each of which is assembled from three rails, the first rail being stationary, the second rail telescopically displaceable over and relative to the first rail and the third rail being telescopically displaceable over and relative to the second rail, and actuating means for causing the second and third rails to be displaced; and wherein the first rail has a substantially U-shaped cross-section at least partly surrounding the displaceable rails, the second rail is made up of two parts each of U-shaped cross-section facing away from each other and which are connected by a connecting web, and the third rail has a substantially I-shaped cross-section.

Figure 2:
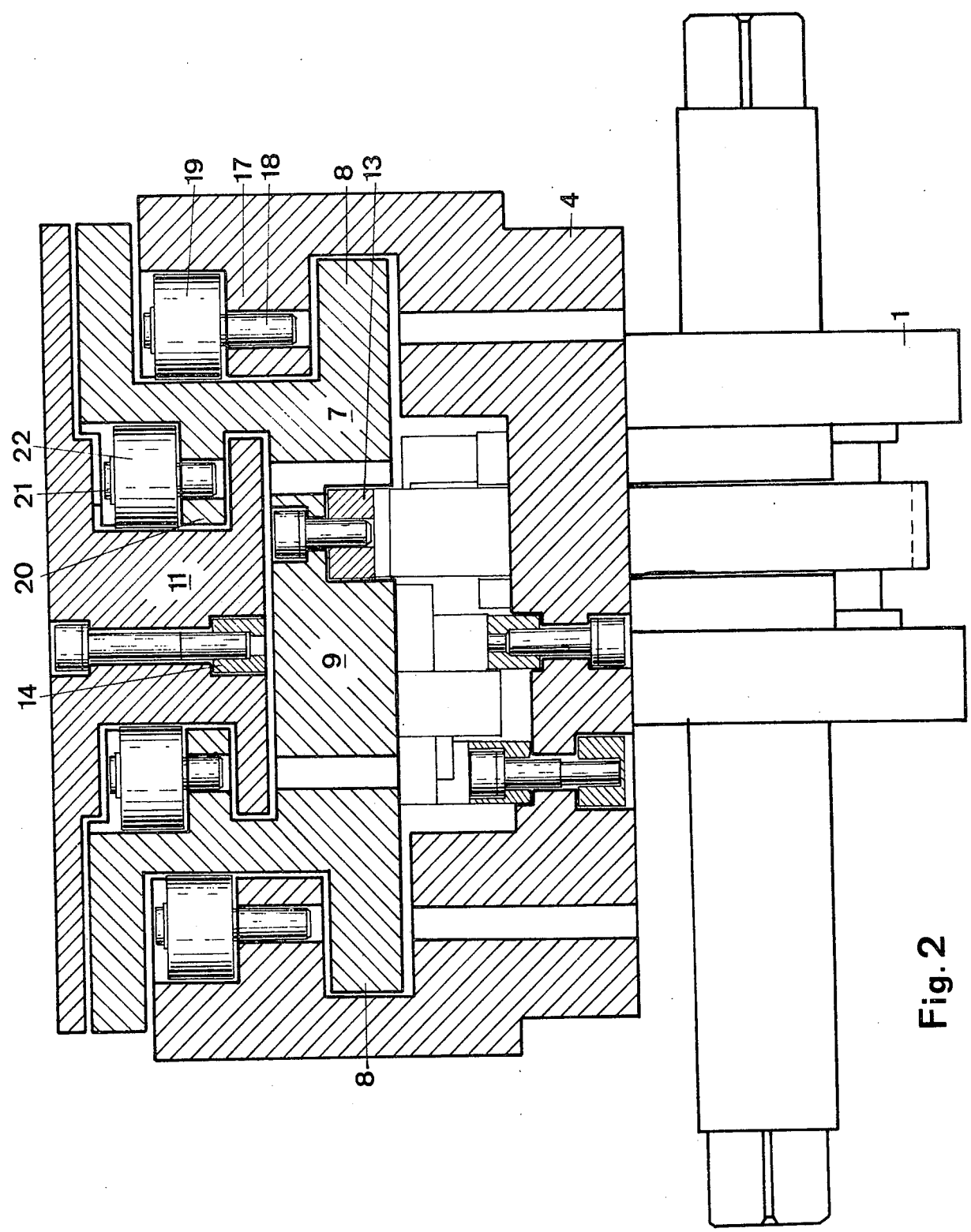

In the accompanying drawings a preferred embodiment of the load displacement apparatus according to the invention is represented, wherein both FIGS. 1 and 2 show a respective transverse cross-section at two different positions through one arm of a telescopic fork.

In FIG. 1 a support beam is designated by 1, which can form e.g. a component of a conveying vehicle such as a fork-lift truck and to which the first, fixed rail 4 of a fork arm is secured by means of two bolts 2 and 3.

The rail 4 is of essentially U-shaped cross-section wherein the internal width defines the width of the fork arm, while the height of the two side walls are somewhat narrower than the total height of a fork arm. At each of the two side walls a respective spindle 5 is fitted which extends perpendicularly from the side walls and is directed inwardly of the U-shaped rail 4. A respective roller 6 is journalled on each of these two spindles 5; the rollers 6 are freely rotatable and serve to guide two displaceable rails 7 and 11 vertically.

The second rail 7 consists of two side parts 8 which are formed with a U-shaped cross-section, thus defining a gap or opening between the limbs of the U. The parts 8 have their openings facing oppositely to each other and are connected together by a connecting web 9.

The openings of the two side parts 8 surround and accommodate the guiding rollers 6 whose diameter at least approximately corresponds to the inner dimension of the opening in the side parts 8. In the base of each side part 8 a respective spindle 23 is fitted perpendicularly thereto. The spindles 23 are mutually oppositely directed and run parallel to the connecting web 9. Each of the spindles 23 carries a freely rotatable supporting roller 10. The rollers 10 serve for guiding the third displaceable rail 11 vertically. The third rail 11 has an I-shaped cross-section, also known as a "double-T-section". One (11a) of the two external parallel surfaces of the rail 11 serves for taking up load and is much wider than the other external parallel surface 11b. The length of the connecting web of the surfaces 11a, 11b is so dimensioned that the internal gap between the two surfaces substantially corresponds to the diameter of the rollers 10.

Each of the three rails 4, 7 and 11 is provided with shoulders formed therein to receive a rigidly fixed rack which, in the case of the fixed rail 4 is designated by 12, by 13 for the second, displaceable rail 7 and by 14 for the load carrier rail 11. A gear wheel 15 is mounted in the support beam 1 and is in mesh with the rack 13 of rail 7 and is driven by any suitable drive means, not shown. A further gear wheel 16 supported at the rail 7 is in mesh with the rack 12 of the fixed rail 4 on one side, and with the rack 14 of the rail 11 on the other side. This gear wheel 16 is not in driving connection with the drive means. Actuation of the gear wheel 15 causes a lateral displacement of the rack 13 relative to the rail 4 and thus an advance (extension) of the rail 7. Through the movement of this rail 7 the gear wheel 16 rolls along the stationary rack 12 and causes through the positive coupling with the rack 14 a lateral displacement of the latter and thus an extension of the rail 11 relative to the rail 7, whereby to result in a telescopic movement of the rails 7 and 11 relative to the fixed rail 4.

It can be seen from FIG. 2 that the side walls of the fixed, U-shaped rail 4 are provided with inwardly projecting extensions 17 each of which is provided to accommodate a respective spindle 18 running transversely thereto and thus parallel with the side walls. Respective rollers 19 are mounted on these spindles 18 and bear against the base of the side parts 8 of rail 7 and assume the transverse or lateral guidance of the latter. Similarly, the bases of parts 8 are provided with mutually oppositely directed, perpendicularly extending projections 20 in which spindles 21, provided for supporting rollers 22, find accommodation. These rollers 22 bear against the connecting web of the uppermost (as viewed) rail 11 and undertake the transverse guidance of this rail 11.

So as to give all the rails, but especially the rails 7 and 11, sufficient strength when loads of 1,500 kg or more are to be supported, they must be made of a high-grade and tough steel which, however, is in itself difficult to work and requires time-consuming fabrication. The shoulders for the racks, the guide rollers and the power transmission means additionally stipulate complicated shaping, so that these rails cannot wholly be produced economically from tough steel in the known manner. Now it was found that the sections serving for making the rails may advantageously be made by extrusion wherein a special die protected by molten glass is to be used. In this way the rails can be made economically and with the required precision, which satisfy the high requirements set by such high loads. The extrusion of the profiles results in such a good surface quality that further machining work for the tracks of the guide rollers is reduced to a minimum.

What we claim is:

1. A loading attachment adapted for close tolerance table lifting and forklifting movement by movable rails at least partly insertable therein for the movement of pallets to storage which is attachable to each of the movable lifting arms of a stacking machine comprising:

a supporting beam fixedly secured to the lifting arms of the stacker;

a first fixed rail of U cross-section to said supporting beam, the internal width of said U section being slightly wider than the width of said rail insertable therein;

the said walls of said U-shaped rails being provided with inwardly projected extensions to accommodate a spindle which extends parallel to the side walls of said first fixed rail;

roller and spindle means fitted in said side walls of said first rail to horizontally guide said insertable rail which is telescopically movable over the first rail and to also guide a third rail which is telescopically movable over the second rail;

a second U-shaped rail having two outwardly opening side parts each of U-shaped cross-section;

a connecting web bridging said oppositely positioned openings in said second rail;

roller and spindle means fitted in the side parts of said second rail for vertically guiding a third displaceable rail;

a third displaceable rail of I-shaped cross-section having top and bottom surfaces and a connecting web therebetween, the top dimension being greater than the bottom dimension;

said third displaceable rail being mounted for horizontal movement in the side parts of said second rail on the roller and spindle means therein;

said wider surface serving as the load bearing surface to support the pallet being moved while the web of the third rail is dimensioned to correspond to the roller fitted in said second rail;

a rack means rigidly secured to said first rail, said second rail and said third rail and gear wheel means formed of tough fine-finished extruded steel mounted on said supporting beam which meshes with said rack means and with the fixed first rail on one side and the second and third rails on the other side so that the gear wheel means is thereby arranged to laterally displace the rack and extend the second displaceable rail and further extend the third displaceable rail to result in telescopic movement of said second and third rails relative to said first rail;

and, shoulder means on said first, second and third rails for supporting the racks and guide rollers associates therewith said shoulder means being formed of extruded steel for a surface finish which is adapted to close fitting movement for the roller means which is guided and tracked in said rails.

* * * * *